United States Patent
Saito et al.

(10) Patent No.: US 6,764,624 B2
(45) Date of Patent: Jul. 20, 2004

(54) METHOD OF PRODUCING FUEL CELL SEPARATOR, FUEL CELL SEPARATOR, AND POLYMER ELECTROLYTE FUEL CELL

(75) Inventors: Kazuo Saito, Chiba (JP); Toshiharu Okamoto, Chiba (JP); Atsushi Hagiwara, Chiba (JP); Ayumi Horiuchi, Chiba (JP)

(73) Assignee: Nisshinbo Industries, Inc., Tokyo (JP)

( * ) Notice: Subject to any disclaimer, the term of this patent is extended or adjusted under 35 U.S.C. 154(b) by 328 days.

(21) Appl. No.: 09/854,588

(22) Filed: May 15, 2001

(65) Prior Publication Data

US 2001/0055710 A1 Dec. 27, 2001

(30) Foreign Application Priority Data

May 15, 2000 (JP) ........................................ 2000-141557

(51) Int. Cl.[7] .............................. D21B 1/04; C09C 1/56
(52) U.S. Cl. ....................... 264/115; 264/117; 264/125; 264/105
(58) Field of Search ................................. 264/115, 117, 264/125, 105

(56) References Cited

U.S. PATENT DOCUMENTS 3,946,996 A * 3/1976 Gergely ...................... 366/139
5,726,105 A * 3/1998 Grasso et al. ............... 442/326
6,494,926 B1 * 12/2002 Saito et al. ................. 29/623.1

* cited by examiner

Primary Examiner—Patrick Ryan
Assistant Examiner—Thomas H. Parsons
(74) Attorney, Agent, or Firm—Birch, Stewart, Kolasch & Birch, LLP.

(57) ABSTRACT

A method of producing a fuel cell separator in which dry granules of a composition for a fuel cell separator mainly containing a conductive material, a binder, and an additive are produced by mixing raw materials including at least the conductive material, the binder, and the additive, granulating the resultant mixture to obtain granules, and drying the granules. The dry granules may be further sized. Then the granules are packed in a mold and hot-press molded. The granules have a residual volatile matter content in a range of 4 weight-% or less, and an average particle size in a range of 200 to 700 μm (60 to 160 μm for the sized granules) and a specific particle size distribution.

6 Claims, 3 Drawing Sheets

METHOD OF PRODUCING FUEL CELL SEPARATOR, FUEL CELL SEPARATOR, AND POLYMER ELECTROLYTE FUEL CELL

BACKGROUND OF THE INVENTION

The present invention relates to a method of producing a fuel cell separator, a fuel cell separator, and a polymer electrolyte fuel cell. In particular, the present invention relates to a method of producing a fuel cell separator at a reduced rate of occurrence of molding failures, accordingly, at a high efficiency, a high quality fuel cell separator produced by the method, and a polymer electrolyte fuel cell including a plurality of unit cells whose separators are partly or entirely composed of the fuel cell separators, which cell has a high gas sealing characteristic and an excellent impact resistance, and is particularly suitable as a movable power supply for automobiles, small-sized marine vessels, etc.

Figure 1:
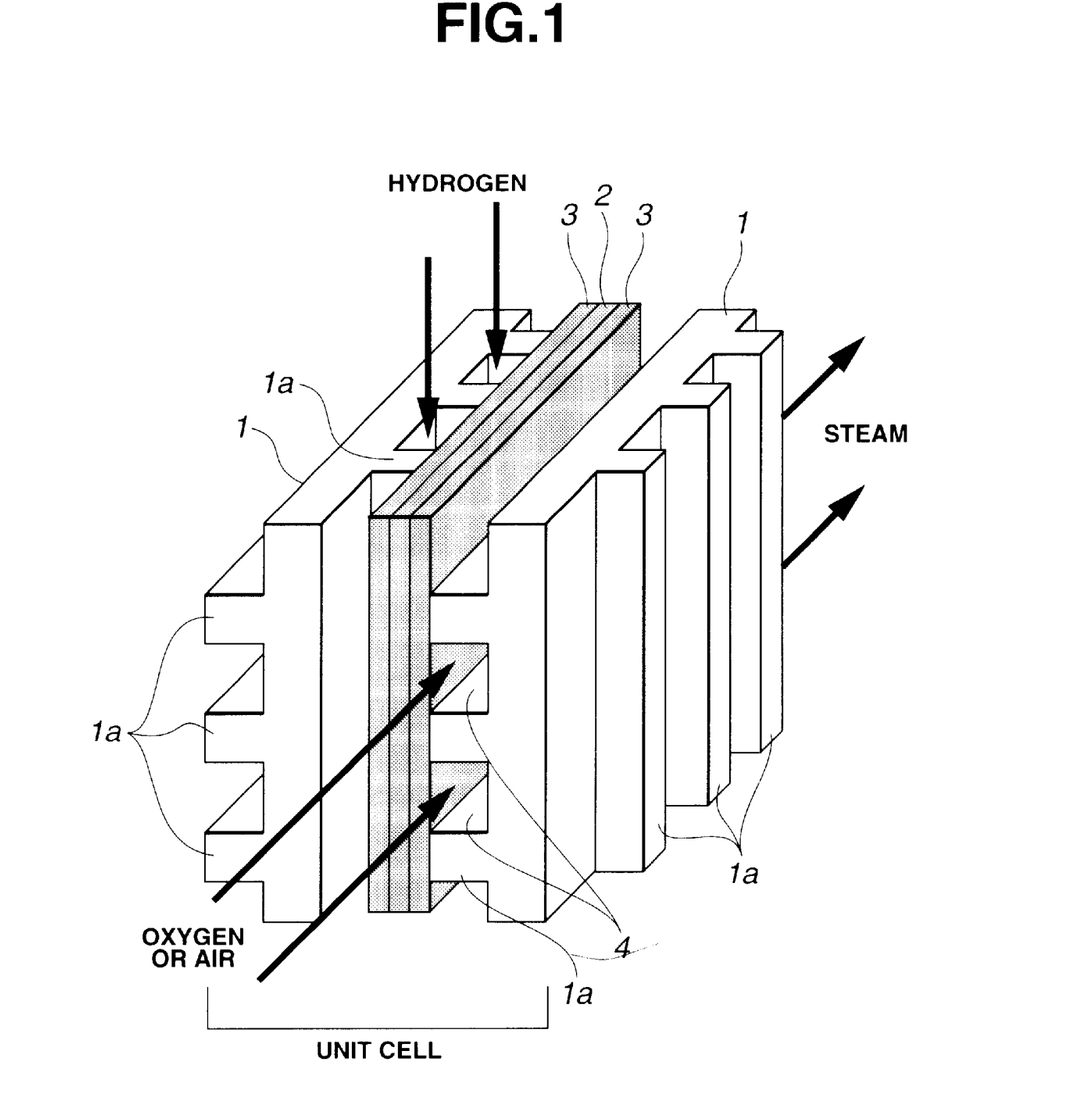
FIG. 1 is a perspective view showing one example of a fuel cell.

A fuel cell, particularly, a polymer electrolyte fuel cell, is configured as a cell stack formed by juxtaposing unit cells of the number of several tens to several hundreds, wherein each of the unit cells includes, as shown in FIG. 1, a pair of fuel cell separators 1 each having on its right and left side surfaces a plurality of ribs 1a, and a polymer electrolyte membrane 2 and two gas diffusion electrodes 3 interposed between these separators 1.

Figure 2:
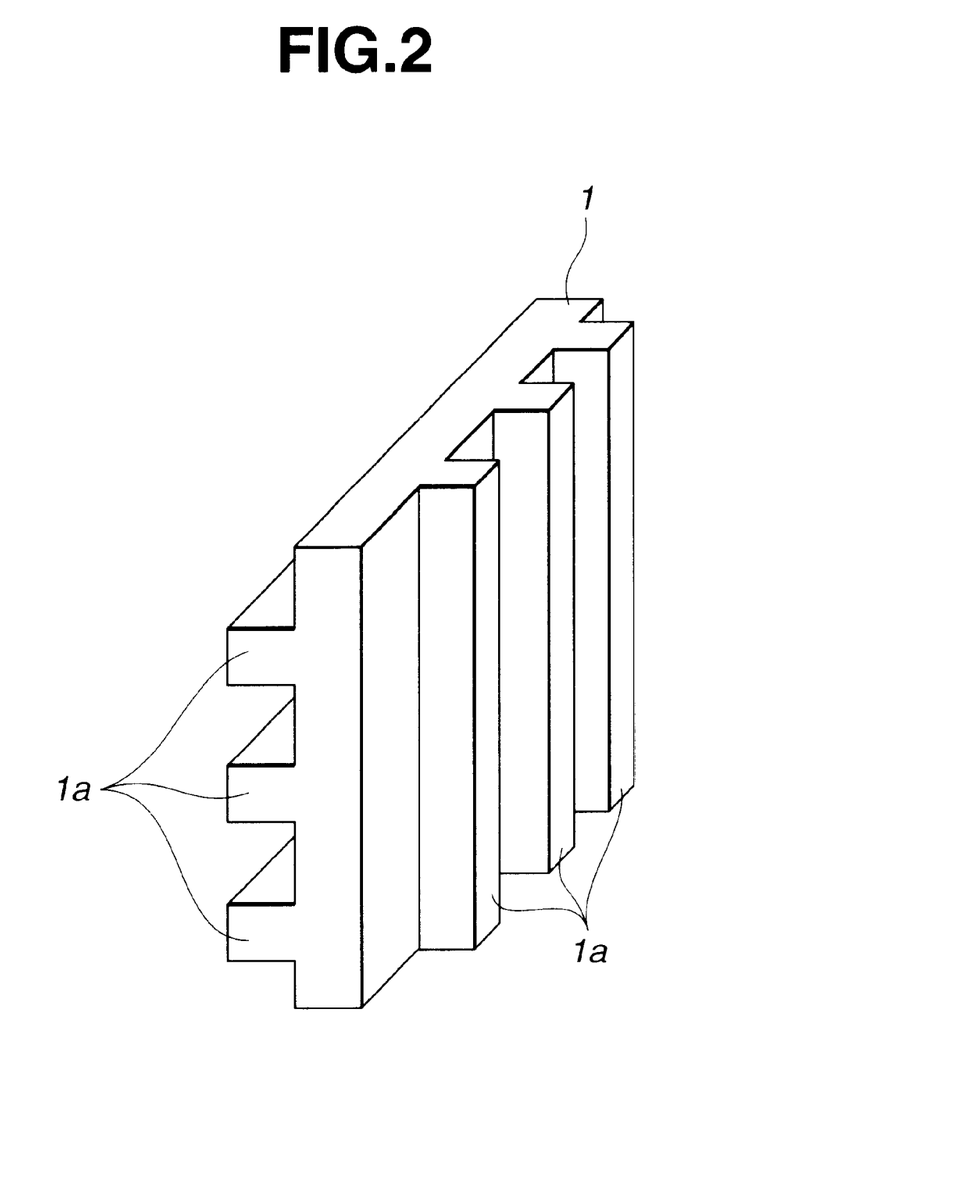
FIG. 2 is a perspective view of a fuel cell separator according to one embodiment of the present invention.

As shown in FIG. 2, the fuel cell separator 1 has a unique shape having the plurality of ribs 1a projecting from the right and left side surfaces of a thin plate-like body, wherein passages (grooves) 4 for supplying and discharging a fuel gas such as hydrogen or oxygen are formed between the ribs 1a on each side of the separator 1 and the corresponding electrode 3. Accordingly, the separator 1 is required to have a high elasticity, an excellent dimensional accuracy, and a desirable gas non-permeability, and the unit cell (fuel cell) is required to have a high gas sealing characteristic capable of preventing a leak of a fuel gas, and an excellent impact resistance, particularly, when the fuel cell is used as a movable power supply for automobiles, etc.

Such a fuel cell separator has been produced by various methods, for example, a method (1) of forming a plate-like body from phenol resin, polyimide resin, or furan resin by molding, hardening and baking the resin of the plate-like body, and forming ribs by machining; a method (2) of impregnating a dense carbon shaped into a plate-like body with a thermosetting resin, and forming ribs by machining; a method (3) of impregnating carbon fiber unwoven fabrics with a conductive paint prepared by adding a solvent and a conductive filler to a thermosetting resin such as epoxy resin or phenol resin, and laminate-molding the resultant fabrics into the shape of a fuel cell separator; and a method (4) of kneading a carbon powder having a particle size of 100 mesh or less with phenol resin, and hot-press molding the kneaded material into the shape of a fuel cell separator.

Each of the methods (1) and (2), however, has problems that since the ribs are formed by machining, the cost is correspondingly raised as well as the number of steps is increased, and that the separator, if it is of a thin type, is liable to be cracked during machining or assembly of a fuel cell.

The method (3) has a problem that the ribs, that is, the grooves of the separator cannot be accurately formed by laminate-pressing because of non-flexibility of the unwoven fabrics.

The method (4) has a problem that since the mixture of the carbon material and the resin is molded, if the content of the carbon material as a conductive filler is made large for improving the conductivity, the moldability and the mechanical strength are degraded, and if the content of the binder resin is made large for improving the moldability and the mechanical strength, the conductivity is lowered because of the small content of the carbon material.

By the way, since a voltage outputted from each unit cell of a fuel cell is low, the fuel cell is required to have an array of unit cells of the number of several tens to several hundreds for ensuring a practical output (<several hundreds kW). Therefore, to uniformly arrange a large number of unit cells in parallel, it is required to establish a technique of producing fuel cell separators, each of which is formed into a uniform shape with no deformation and no partial unevenness in thickness, on a large scale with a high yield without occurrence of molding failures such as chips, cavities, and the like.

The conventional method of producing a fuel cell separator mainly containing a thermosetting resin such as phenol resin and graphite, however, cannot satisfy the above-described requirement. The reason for this is as follows. The conventional method generally involves packing a compound in a separator mold having a specific shape, and hot-press molding the compound for 5 to 10 min at a temperature of 150 to 160° C. and a pressure of 10 to 50 MPa. Such a method has a problem, from the viewpoint of uniformly producing fuel cell separators with a high quality, that since the compound contains a large amount of graphite for imparting a necessary conductivity, the flowability of the compound is poor and accordingly it is difficult to uniformly pack the compound in the separator mold, to cause a large number of molding failures. The conventional method has another problem that molding failures may occur due to a gas generated at the time of hot-press molding.

SUMMARY OF THE INVENTION

An object of the present invention is to provide a method of producing a fuel cell separator at a reduced rate of occurrence of molding failures, accordingly, at a high efficiency, a fuel cell separator produced by the method and having a high dimensional stability, an excellent gas non-permeability, and a uniform quality, and a polymer electrolyte fuel cell including a plurality of unit cells whose separators are partly or entirely composed of the fuel cell separators, which cell has a high gas sealing characteristic and an excellent impact resistance, and is particularly suitable as a movable power supply for automobiles, small-sized marine vessels, etc.

To achieve the above object, the present inventor has examined to improve a method of producing a fuel cell separator. The production method includes the steps of producing dry granules of a composition for a fuel cell separator mainly containing a conductive material, a binder, and an additive by mixing raw materials of the composition, granulating the mixture, and drying the granules; and packing the dry granules in a mold, and hot-press molding the dry granules. With respect to such a method, the present inventor has found that, to produce a high quality fuel cell separator at a high production yield, it is effective to adjust an average particle size and particle size distribution of the dry granules in respective specific ranges and to reduce a residual volatile matter content of the dry granules.

Figure 3:
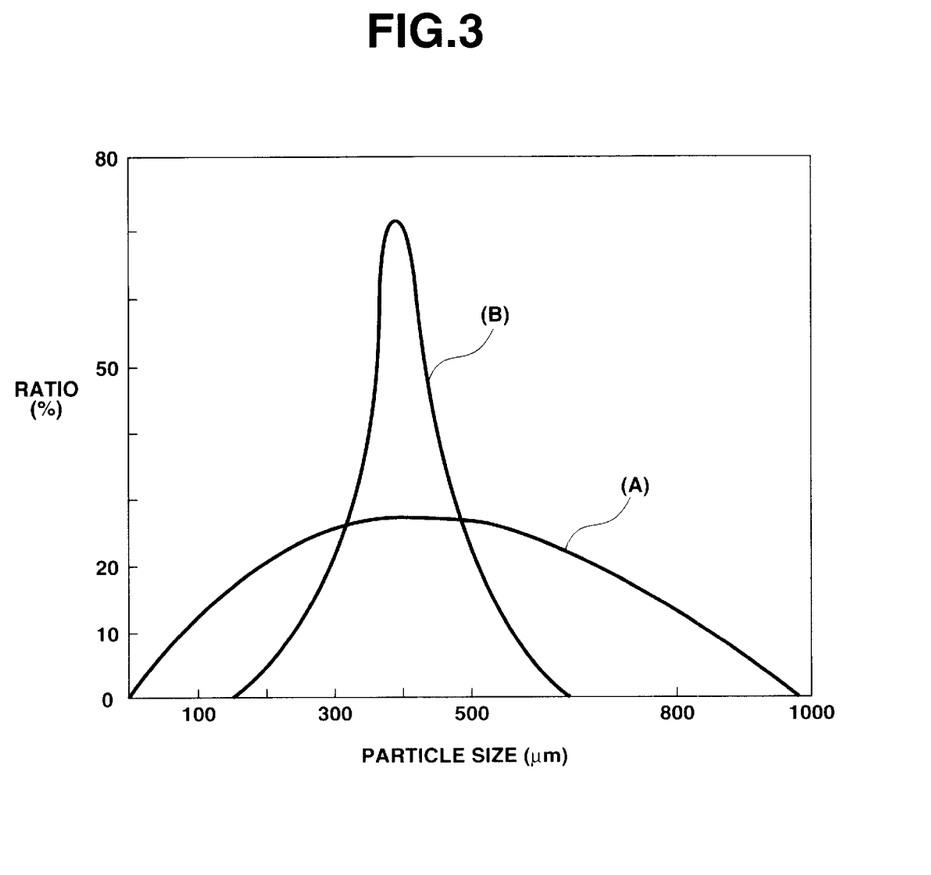
FIG. 3 is a graph showing a particle size distribution of granules.

The findings by the present inventor will be described in detail with reference to FIG. 3. FIG. 3 is a graph showing a particle size distribution of dry granules of a composition for a fuel cell separator, produced by mixing, granulating and drying. In this graph, a curve (B) shows a sharp particle size distribution of a granule sample A, and a curve (A) shows a gentle particle size distribution of a granule sample B. In the case of packing each of the granule samples A and B in a separator mold, even if the average particle size of the granule sample A is equal to that of the granule sample B, the degree of occurrence of voids of the granule sample A is larger than that of the granule sample B, and therefore, it is difficult to uniformly pack the granule sample A as compared with the granule sample B. That is to say, it has been found that the use of granules having a suitable average particle size and having a wide particle size distribution, or the use of fine granules most of which have particle sizes smaller than 500 µm, produced by sizing the granules obtained by mixing, granulating and drying, is effective to improve the flowability and the packing rate of the granules and hence to suppress the occurrence of molding failures. Further, it has been found that the reduction in a residual volatile matter content of the granules is effective to make the generation of gas at the time of molding as small as possible and hence to suppress the occurrence of molding failures.

As a result of further examination of the production method on the basis of the above-described knowledge, the present inventor has found the following fact. Namely, granules having a residual volatile matter content of 4 parts by mass or less, an average particle size in a range of 200 to 700 µm, and a particle size distribution (5 to 30% of particles: 5 µm≦D (particle size) <100 µm, 10 to 40% of particles: 100 µm≦D<300 µm, 10 to 50% of particles: 300 µm≦D<500 µm, and balance: 500 µm≦D<1000 µm) are obtained by adding and mixing the additive to and with the conductive material, to obtain a sub-mixture, adding the binder to the sub-mixture in an amount of 5 to 30 parts by mass on the basis of 100 parts by mass of the conductive material and simultaneously adding a solvent to the sub-mixture in an amount of 20 parts by mass or less on the basis of 100 parts by mass of the conductive material, and wet-mixing the sub-mixture with the binder and the solvent; or fine granules most of which have sizes in a range of less than 500 µm are obtained by further sizing the granules obtained by the above production method. The present inventor has further found that, by the use of the above granules or fine granules, it is possible to significantly improve the flowability and the packing rate of the granules and hence to uniformly pack the granules or fine granules in a separator mold having a significantly complicated groove structure, and to significantly reduce the generation of gas at the time of molding, and therefore, it is possible to produce a fuel cell separator having a high dimensional stability and a high quality at a very low rate of occurrence of molding failures such as chips or cavities.

The present inventor has also examined to improve a polymer electrolyte fuel cell, and found that a polymer electrolyte fuel cell which has an excellent gas sealing characteristic and a high impact resistance, and which is particularly suitable as a movable power supply for automobiles, small-sized marine vessel, etc. is obtained by using, as part or all of separators of unit cells of the fuel cell, the above-described fuel cell separators having an excellent gas non-permeability and a high quality without occurrence of molding failures.

Accordingly, a first aspect of the present invention, there is provided a method of producing a fuel cell separator, including the steps of: producing dry granules of a composition for a fuel cell separator mainly containing a conductive material, a binder, and an additive by mixing raw materials including at least the conductive material, the binder, and the additive, granulating the resultant mixture to obtain granules, and drying the granules; and packing the dry granules in a mold, and hot-press molding the dry granules packed in the mold; wherein a residual volatile matter content of the dry granules is in a range of 4 wt % or less; an average particle size of the dry granules is in a range of 200 to 700 µm; and a particle size distribution of the dry granules is as follows:

| particle size | percentage |
|---|---|
| 5 µm or more and less than 100 µm | 5 to 30% |
| 100 µm or more and less than 300 µm | 10 to 40% |
| 300 µm or more and less than 500 µm | 10 to 50% |
| 500 µm or more and less than 1000 µm | balance |

According to a second aspect of the present invention, there is provided a method of producing a fuel cell separator, including the steps of: producing sized dry granules of a composition for a fuel cell separator mainly containing a conductive material, a binder, and an additive by mixing raw materials including at least the conductive material, the binder, and the additive, granulating the resultant mixture to obtain granules, drying the granules, and sizing the dry granules; and packing the sized dry granules in a mold, and hot-press molding the sized dry granules packed in the mold; wherein a residual volatile matter content of the sized dry granules is in a range of 4 wt % or less; an average particle size of the sized dry granules is in a range of 60 to 160 µm; and a particle size distribution of the sized dry granules is as follows:

| particle size | percentage |
|---|---|
| 5 µm or more and less than 100 µm | 10 to 80% |
| 100 µm or more and less than 300 µm | 10 to 40% |
| 300 µm or more and less than 500 µm | balance |

According to a third aspect of the present invention, there is provided a method of producing a fuel cell separator, including the steps of: producing dry granules of a composition for a fuel cell separator mainly containing a conductive material, a binder, and an additive by mixing raw materials including at least the conductive material, the binder, and the additive, granulating the resultant mixture to obtain granules, and drying the granules; and packing the dry granules in a mold, and hot-press molding the dry granules packed in the mold; wherein the step of mixing raw materials including at least the conductive material, the binder, and the additive comprises the steps of: adding and mixing the additive to and with the conductive material, to obtain a sub-mixture; adding the binder to the sub-mixture in an amount of 5 to 30 parts by mass on the basis of 100 parts by mass of the conductive material and simultaneously adding a solvent to the sub-mixture in an amount of 20 parts by mass or less on the basis of 100 parts by mass of the conductive material; and wet-mixing the sub-mixture with the binder and the solvent.

According to a fourth aspect of the present invention, there is provided a fuel cell separator produced by any one of the production methods according to the first, second, and third aspects of the present invention, wherein a gas permeability of the separator, measured by a method B specified under JIS K7126, is in a range of 30 cc/m$^2$·24 hr·atm or less.

According to a fifth aspect of the present invention, there is provided a polymer electrolyte fuel cell including: a plurality of unit cells juxtaposed, each of which has a pair of electrodes disposed with a polymer electrolyte membrane put therebetween, and a pair of separators disposed with the electrodes put therebetween and shaped to form gas supply/discharge passages between the separators and the electrodes; wherein the fuel cell separators according to the fourth aspect of the present invention are used as part or all of the separators in the fuel cell.

DETAILED DESCRIPTION OF THE PREFERRED EMBODIMENT

Hereinafter, the present invention will be described in detail.

A method of producing a fuel cell separator according to the present invention includes the steps of: producing dry granules of a composition for a fuel cell separator mainly containing a conductive material, a binder, and an additive by mixing raw materials including at least the conductive material, the binder, and the additive, granulating the resultant mixture to obtain granules, and drying the granules; and packing the dry granules in a mold, and hot-press molding the dry granules packed in the mold.

The composition for a fuel cell separator according to the present invention mainly contains, as described above, the conductive material (A), the binder (B), and the additive (C).

Specific examples of the conductive materials (A) may include carbon black, ketchen black, acetylene black, carbon whiskers, graphite, metal fibers, and powders of titanium oxide, ruthenium oxide, and the like. These materials may be singly or in combination. In particular, graphite is preferably used as the conductive material (A).

Graphite may be natural graphite or artificial graphite, and may be of any shape such as flake, massive, needle or spherical shape. The average particle size of graphite is preferably in a range of 10 to 80 $\mu$m, more preferably, in a range of 20 to 60 $\mu$m.

As the binder (B), there may be used a thermosetting resin usually adopted for a fuel cell separator. Specific examples of the thermosetting resins may include a phenol based resin such as resol type phenol resin or novolac type phenol resin; a furan based resin such as furfuryl alcohol resin, furfuryl alcohol furfural resin, or furfuryl alcohol phenol resin; polyimide resin; polycarbodiimide resin; polyacrylonitrile resin; pyrene-phenanthrene resin; poly(vinyl chloride); epoxy resin; urea resin; diallyl phthalate resin; unsaturated polyester resin; and melamine resin. These materials may be used singly or in combination. In particular, the phenol based resin is preferable in terms of cost and durability.

The content of the binder (B) may be in a range of 5 to 30 parts by mass, preferably, 10 to 25 parts by mass on the basis of 100 parts by mass of the conductive material (A). If the content of the binder (B) is less than 5 parts by mass, the mixing and the granulation of the composition becomes difficult, which fails to obtain granules having a desired average particle size and a desired particle size distribution, and which degrades the strength of the final separator and increase the gas permeability of the separator. Meanwhile, if the content of the binder (B) is more than 30 parts by mass, the content of the conductive material (A) becomes correspondingly small, to lower the conductivity of the final separator, thereby failing to achieve the object of the present invention.

The binder (B) is preferably used in the form of a mixture with a solvent. Specific examples of the solvents may include an alcohol based solvent such as methanol, ethanol, butanol, or isopropyl alcohol; a ketone based solvent such as acetone, methyl ethyl ketone, methyl isobutyl ketone; a glycol based solvent such as ethylene glycol or diethylene glycol; a furan based solvent such as furan, furfural, furfuryl alcohol; and others such as water, toluene, and methylene chloride. These solvents may be used singly or in combination. The content of the solvent may be in a range of 20 parts by mass or less, preferably, 0 to 20 parts by mass, more preferably, 0 to 15 parts by mass on the basis of 100 parts by mass of the conductive material (A).

The additive (C) is added to improve the mold releasability, hydrolysis resistance, etc. Specific examples of the additives may include a lubricant such as zinc stearate or stearic acid, a plasticizer, a mold releasing agent, a stabilizer, an oxidation inhibitor, and a hydrolysis resisting agent. The content of the additive (C) may be in a range of 2 parts by mass or less, preferably, 0.5 to 2 parts by mass on the basis of 100 parts by mass of the conductive material (A).

Additionally, the composition for a fuel cell separator according to the present invention may contain, in addition to the components (A), (B) and (C), a fiber base material, a metal powder, etc. for improving the strength, the conductivity, etc., as needed.

Specific examples of the fiber based materials may include inorganic fibers such as metal fibers of iron, copper, brass, bronze, aluminum, etc., ceramic fibers, fibers of potassium titanate, glass fibers, carbon fibers, rock wool, wollastonite, sepiolite, attapulgite, and artificial mineral fibers; and organic fibers such as aramid fibers, polyimide fibers, polyamide fibers, phenol fibers, cellulose, and acrylic fibers. These fiber base materials may be used singly or in combination. The content of the fiber based material may be in a range of 0 to 10 parts by mass on the basis of 100 parts by mass of the conductive material (A).

Specific examples of the metal powders may includes powders of stainless steel, gold, silver, copper, platinum, titanium, aluminum, nickel, magnesium, etc. The particle size of the metal powder is generally in a range of 5 to 30 $\mu$m.

In accordance with the production method of the present invention, dry granules of a composition for a fuel cell separator mainly containing the above-described conductive material (A), binder (B), and additive (C) are produced by mixing raw materials including at least the conductive material (A), binder (B), and additive (C), granulating the resultant mixture to obtain granules, and drying the granules, and the dry granules thus produced are packed in a mold and hot-press molded. In this production method, preferably, the mixing step is performed by adding and mixing the additive (C) to and with the conductive material (A), to obtain a sub-mixture, adding the binder (B) to the sub-mixture in an amount of 5 to 30 parts by mass on the basis of 100 parts by mass of the conductive material (A) and simultaneously adding a solvent to the sub-mixture in an amount of 20 parts by mass or less on the basis of 100 parts by mass of the conductive material (A), and wet-mixing and granulating the sub-mixture with the binder (B) and the solvent by a granulator or the like. In this case, granules having a specific average particle size and a specific particle size distribution can be obtained. As the granulator, there can be used a granulator sold by SEISHIN ENTERPRISE CO., LTD. under the trade name of "New Gramachine 750 Type".

The average particle size of the above-described granules may be in a range of 200 to 700 $\mu$m, preferably, 200 to 600 $\mu$m, more preferably, 200 to 500 $\mu$m, most preferably, 200 to 400 $\mu$m. The particle size distribution of the granules, which is measured by a laser diffraction method, may be as follows:

| particle size (D) | percentage |
| --- | --- |
| 5 μm ≦ D < 100 μm | 5–30%, preferably, 5–25% |
| 100 μm ≦ D < 300 μm | 10–40%, preferably, 10–30% |
| 300 μm ≦ D < 500 μm | 10–50%, preferably, 15–40% |
| 500 μm ≦ D < 1000 μm | balance |

By the use of the granules having a suitable average particle size and a wide particle size distribution in a range of 5 μm or more and less than 1000 μm, it is possible to improve the flowability of the granules, and hence to uniformly pack the granules in a separator mold having a complicated groove structure and thereby prevent the occurrence of molding failures. If either of the average particle size and the particle size distribution is less than the above-described range, the flowability of the granules is degraded, resulting in molding failures. On the other hand, if either of the average particle size and the particle size distribution is more than the above-described range, voids are formed at the timing of packing the granules in the mold, resulting in molding failures.

According to the present invention, preferably, the granules produced as described above are further sized. The average particle size of the sized granules may be in a range of 60 to 160 μm, preferably, 80 to 140 μm. The particle size distribution of the sized granules, which is measured by a laser diffraction method, may be as follows:

| particle size (D) | percentage |
| --- | --- |
| 5 μm ≦ D < 100 μm | 10–80%, preferably, 20–70% |
| 100 μm ≦ D < 300 μm | 10–40%, preferably, 15–30% |
| 300 μm ≦ D < 500 μm | balance. |

If either of the average particle size and the particle size distribution of the sized granules is out of the above range, the packing characteristic at the time of packing the sized granules in a separator mold having a complicated groove structure, and a dimensional stability of the molded product are both degraded, thereby failing to achieve the object and effect of the present invention.

In addition, the method of sizing the granules is not particularly limited. In general, the granules may be sized by a sizer having a mesh of 1.0 mm or less, preferably, 0.5 mm or less to satisfy the above requirements in terms of the average particle size and the particle size distribution.

According to the present invention, the granules thus obtained is dried by a vacuum dry method, a fluid bed dry method, a jet drier method, or an elevated temperature dry method. In this treatment, a residual volatile matter content of the granules may be in a range of 4 parts by mass or less, preferably, 1.5 to 4 parts by mass. It is to be noted that the residual volatile matter content of the granules is calculated on the basis of a reduction in weight of the granules after the granules are dried in an infrared heating furnace kept at 130° C. for 30 min. If the residual volatile matter content of the granules is excessively low, molding failures may become large, particularly, cavities are easy to be formed. On the other hand, if the residual volatile matter content is more than 4 parts by mass, the occurrence of gas at the time of molding becomes large, with a result that molding failures become large.

The final granules thus specified in terms of the average particle size, particle size distribution, and residual volatile matter content according to the present invention are packed in a separator mold having a complicated groove structure, hot-press molded for 5 to 10 min at a temperature of 150 to 160° C. and a pressure of 10 to 50 MPa, and heat-treated for 0 to 72 hr at a temperature of 130 to 200° C.

According to the production method of the present invention, a thin fuel cell separator having a unique shape formed by providing a large number of ribs on right and left side surfaces of a thin plate-like body can be produced at a reduced rate of occurrence of molding failures such as cavities and chips, accordingly, with a high quality.

The fuel cell separator thus obtained according to the present invention is specified such that the gas permeability of the separator, measured in accordance with a method B under JIS K7126, is in a range of 30 cc/m²·24 hr·atm or less, preferably, 2 to 30 cc/m²·24 hr·atm, more preferably, 2 to 10 cc/m²·24 hr·atm. If the gas permeability is larger than 30 cc/m²·24 hr·atm, there will occur a leak of a fuel gas at the time of assembling the separator into a fuel cell, thereby failing to achieve the object and effect of the present invention.

The fuel cell separator of the present invention may be further specified such that the flexural strength under JIS K6911 is in a range of 20 to 80 MPa, more preferably, 30 to 60 MPa; the flexural modulus under JIS K6911 is in a range of 3 to 60 Gpa, preferably, 10 to 55 Gpa; and the deformation under JIS K6911 is in a range of 0.1 to 2 mm, preferably, 0.5 to 1.5 mm.

According to the present invention, there is further provided a polymer electrolyte fuel cell having a structure in which a plurality of unit cells are juxtaposed, each of the unit cells having a pair of electrodes disposed with a polymer electrolyte membrane put therebetween, and a pair of separators disposed with the electrodes put therebetween and shaped to form gas supply/discharge passages between the separators and the electrodes, wherein the separators in the fuel cell are composed of the above-described fuel cell separators of the present invention.

In the configuration of the above fuel cell, all of the separators in the fuel cell are not necessarily composed of the above-described fuel cell separators of the present invention, that is, part or all of the separators in the fuel cell may be composed of the above-described fuel cell separators of the present invention. To be more specific, 50% or more, preferably, 50 to 100%, more preferably, 70 to 100%, most preferably, 80 to 100% of the total separators in the fuel cell may be composed of the fuel cell separators of the present invention. The ratio of the number of the fuel cell separators of the present invention on the basis of the total number of the separators in the fuel cell is less than 50%, the gas sealing characteristic and impact resistance of the fuel cell may be degraded, thereby failing to achieve the object and effect of the present invention. Additionally, as the separators other than the fuel cell separators of the present invention, there can be used separators having been generally used for a fuel cell.

As the above-described polymer electrolyte membrane, there may be used a polymer electrolyte membrane of a type generally used for a polymer electrolyte fuel cells, for example, a proton conductive ion exchange membrane formed by a fluorine based resin, which is represented by a film of poly(trifluorostyrene sulfonic acid) or a film of poly(perfluorocarbon sulfonic acid) sold under the trade name of NAFION. The surface of the electrolyte membrane is coated with a paste obtained by preparing a carbon powder supporting a catalyst such as platinum or a platinum alloy containing another metal, and dispersing the resultant carbon powder in an organic solvent such as a mixed solution (trade name: NAFION 117 solution) of lower fatter acid group alcohol containing perfluorocarbon sulfonic acid and water.

Each of a pair of the above-described electrodes disposed with the polymer electrolyte membrane put therebetween can be formed of a carbon paper, a carbon felt, or a carbon cloth of woven carbon fibers.

The electrolyte membrane is integrated with the pair of electrodes by interposing the electrolyte membrane between the pair of electrodes, and bonding them by thermo-compression at 120° C. to 130° C., or by bonding the electrolyte membrane to the pair of electrodes by using an additive.

The electrodes in which the electrolyte membrane is integrally interposed are mounted between a pair of the separators in such a manner that passages capable of supplying and discharging fuel gases are formed between the separators and the electrodes, to thus obtain a unit cell. In this case, the electrodes in which the electrolyte membrane is integrally interposed may be mounted between the separators by coating with an adhesive the end surfaces to be in contact with the electrodes of the ribs of the separators, thus bonding the electrodes to the ribs of the separators.

The polymer electrolyte fuel cell of the present invention, configured such that the fuel cell separators of the present invention are used part (preferably, 50% or more) or all of the total separators in the fuel cell, has a high gas sealing characteristic and a high impact resistance, and is particularly suitable as a movable power supply for automobiles, small-sized marine vessels, etc.

Additionally, the polymer electrolyte fuel cell of the present invention can be used, in addition to a movable power supply for automobiles, small-sized marine vessels, etc., widely in various applications such as a small scale area power plant, a household power generator, a simple power supply for a camp site, an artificial satellite, and a power supply for space development.

According to the present invention, it is possible to produce a fuel cell separator having a high elasticity, an excellent dimensional accuracy, and a high gas non-permeability with no molding failures, accordingly, with a high quality, and at a high yield, and to obtain a high quality polymer electrolyte fuel cell having a high gas sealing characteristic and an excellent impact resistance by using the high quality fuel cell separators as part or all of separators in the fuel cell.

The present invention will be more clearly understood by way of, while not limited thereto, the following examples.

EXAMPLES

Inventive Example 1

First, 100 parts by mass of flake graphite having an average particle size of 30 $\mu$m was mixed with one part by mass of zinc stearate. Then, 10 parts by mass of resol type phenol resin and 20 parts by mass of a methanol solution were added to the mixture, to prepare a raw material for a fuel cell separator. The raw material was then wet-mixed and granulated for 30 min by using a granulator (trade name: New Gramachine 750 Type, sold by SEISHIN ENTERPRISE CO., LTD.), to obtain granules. The average particle size of the granules was 300 $\mu$m, and the particle size distribution thereof, measured by a laser diffraction method, was as follows:

| particle size | percentage |
| --- | --- |
| 5 $\mu$m or more and less than 100 $\mu$m | 20% |
| 100 $\mu$m or more and less than 300 $\mu$m | 25% |

-continued

| particle size | percentage |
| --- | --- |
| 300 $\mu$m or more and less than 500 $\mu$m | 40% |
| 500 $\mu$m or more and less than 1000 $\mu$m | 15% |

The granules thus obtained were dried by a vacuum dry method. The residual volatile matter content of the granules after drying was 3 parts by mass. The dry granules were packed in a mold and hot-press molded for 5 min at 150° C. and at 19.6 MPa, to prepare a test piece having a size of 100 mm×10 mm×4 mm.

The flexural strength, flexural modulus, and deformation of the test piece thus obtained were measured under a condition of a clamping support-to-clamping support distance of 80 mm in accordance with a general testing method for a thermosetting plastic specified in JIS K6911. Further, the resistivity of the test piece was measured in accordance with a four-probe method of the resistivity measurement for a silicon single crystal and a silicon wafer specified in JIS H 0602. The results are shown in Table 1.

Next, the above granules were packed in a separator mold allowing to mold the granules into the shape of a separator having fuel passages, and hot-press molded for 5 min at 150° C. and at 19.6 MPa, to prepare a fuel cell separator having a size of 120 mm (length)×120 mm (width)×2.3 mm (thickness) and having ribs on right and left side surface thereof as shown in FIG. 2.

The performances of the fuel cell separator thus obtained were evaluated in accordance with the following criteria:

Moldability

○: good

Δ: slightly poor

X: no good

Releasability

○: good

Δ: slightly poor

X: no good

Dimensional Stability

○: good

Δ: slightly poor

X: no good

Gas Permeability under method B in JIS K7126

The results are shown in Table 1.

Inventive Example 2

First, 100 parts by mass of massive graphite having an average particle size of 60 $\mu$m was mixed with one part by mass of zinc stearate. Then, 20 parts by mass of resol type phenol resin, 8 parts by mass of novolac type phenol resin, and 20 parts by mass of a methanol solution were added to the mixture, to prepare a raw material for a fuel cell separator. The raw material was then wet-mixed and granulated for 25 min by using the same granulator as that in Inventive Example 1, to obtain granules. The average particle size of the granules was 300 $\mu$m, and the particle size distribution thereof was as follows:

| particle size | percentage |
|---|---|
| 5 μm or more and less than 100 μm | 25% |
| 100 μm or more and less than 300 μm | 20% |
| 300 μm or more and less than 500 μm | 20% |
| 500 μm or more and less than 1000 μm | 35% |

The granules thus obtained were dried by the vacuum dry method. The residual volatile matter content of the granules after drying was 3.5 parts by mass. The dry granules were then sized by using a sizer having a mesh of 0.5 mm. The average particle size of the sized granules was 120 μm, and the particle size distribution thereof was as follows:

| particle size | percentage |
|---|---|
| 5 μm or more and less than 100 μm | 70% |
| 100 μm or more and less than 300 μm | 20% |
| 300 μm or more and less than 500 μm | 10% |

The sized granules were packed in the same mold as that used in Inventive Example 1 and hot-press molded for 5 min at 150° C. and at 19.6 MPa, to prepare a test piece having a size of 100 mm×10 mm×4 mm.

The flexural strength, flexural modulus, and deformation of the test piece thus obtained were measured under in the condition of a clamping support-to-clamping support distance of 80 mm in accordance with the above-described general testing method for a thermosetting plastic specified in JIS K6911. Further, the resistivity of the test piece was measured in accordance with the above-described four probe method of the resistivity measurement for a silicon single crystal and a silicon wafer specified in JIS H 0602. The results are shown in Table 1.

Next, the above sized granules were packed in the same separator mold, allowing to mold the granules into the shape of a separator having fuel passages, as that in Inventive Example 1, and hot-press molded for 5 min at 150° C. and at 19.6 MPa and heat-treated, to prepare a fuel cell separator having a size of 120 mm (length)×120 mm (width)×2.3 mm (thickness) and having ribs on right and left side surface thereof as shown in FIG. 2.

The performances of the fuel cell separator thus obtained were evaluated in the same manner as that described in Inventive Example 1. The results are shown in Table 1.

Comparative Example 1

The procedure in Inventive Example 1 was repeated except that the granules were not dried, to obtain granules in Comparative Example 1, and to obtain a test piece and a fuel cell separator using the granules. The residual volatile matter content of the granules was 10 parts by mass.

The performances of the test piece and the fuel cell separator thus obtained were evaluated in the same manner as that described in Inventive Example 1. The results are shown in Table 1.

Comparative Example 2

First, 100 parts by mass of flake graphite having an average particle size of 60 μm was mixed with one part by mass of zinc stearate. Then, 20 parts by mass of resol type phenol resin was added to the mixture, to prepare a raw material for a fuel cell separator. The raw material was then dry-mixed and granulated for 5 min by using the same granulator as that in Inventive Example 1, to obtain granules. The average particle size of the granules was 100 μm, and the particle size distribution thereof was as follows:

| particle size | percentage |
|---|---|
| 5 μm or more and less than 100 μm | 70% |
| 100 μm or more and less than 300 μm | 20% |
| 300 μm or more and less than 500 μm | 10% |

The granules thus obtained were dried by the vacuum dry method. The residual volatile matter content of the granules after drying was 3 parts by mass. The dry granules were packed in the same mold as that used in Inventive Example 1 and hot-press molded for 5 min at 150° C. and at 19.6 MPa, to prepare a test piece having a size of 100 mm×10 mm×4 mm.

The flexural strength, flexural modulus, and deformation of the test piece thus obtained were measured under the condition of a clamping support-to-clamping support distance of 80 mm in accordance with the above-described general testing method for a thermosetting plastic specified in JIS K6911. Further, the resistivity of the test piece was measured in accordance with the above-described four probe method of the resistivity measurement for a silicon single crystal and a silicon wafer specified in JIS H 0602. The results are shown in Table 1.

Next, the above granules were packed in the same separator mold, allowing to mold the granules into the shape of a separator having fuel passages, as that in Inventive Example 1, and hot-press molded for 5 min at 150° C. and at 19.6 MPa, to prepare a fuel cell separator having a size of 120 mm (length)×120 mm (width)×2.3 mm (thickness) and having ribs on right and left side surface thereof as shown in FIG. 2.

The performances of the fuel cell separator thus obtained were evaluated in the same manner as that described in Inventive Example 1.

TABLE 1

| | Inventive Example | | Comparative Example | |
|---|---|---|---|---|
| | 1 | 2 | 1 | 2 |
| Flexural strength (MPa) | 50 | 50 | 30 | 20 |
| Flexural modulus (Gpa) | 40 | 20 | 40 | 20 |
| Deformation (mm) | 0.6 | 1.0 | 0.2 | 0.3 |
| Resistivity (mΩ · cm) | 10 | 15 | 20 | 60 |
| Moldability | ○ | ○ | X | X |
| Releasability | ○ | ○ | X | ○ |
| Dimensional stability | ○ | ○ | X | X |
| Gas permeability (cc/m$^2$ · 24 hr · atm) | 4 | 8 | 1000 | 10000 |

As is apparent from Table 1, each of the fuel cell separators in Inventive Examples 1 and 2, which satisfies the requirements in terms of the average particle size and the particle size distribution of granules according to the present invention, are good in all of the moldability, releasability, and dimensional stability, and has a very low gas permeability. On the contrary, the fuel cell separator in Comparative Example 1, which has been not subjected to vacuum drying, is not good in all of the moldability, releasability, and dimensional stability, and has a gas permeability larger than that of each of the fuel cell separators in Inventive Examples 1 and 2. The fuel cell separator in Comparative Example 2, which does not satisfy the requirements in terms of the average particle size and the particle size distribution according to the present invention, is good only in releasability but is not good in both moldability and dimensional stability, and has a gas permeability significantly larger than that of each of the fuel cell separators in Inventive Examples 1 and 2.

Accordingly, from the results shown in Table 1, it becomes apparent that the present invention makes it possible to significantly improve the flowability and the packing rate of the granules and hence to uniformly pack the granules in a separator mold having a significantly complicated groove structure, and to significantly reduce the generation of gas at the time of molding, and therefore, the present invention makes it possible to produce a fuel cell separator having a high dimensional stability and a high quality at a very low rate of occurrence of molding failures such as chips or cavities.

Inventive Example 3
Polymer Electrolyte Fuel Cell (1)

A polymer electrolyte membrem (trade name: Nafion) was put between a pair of electrodes formed by a carbon paper (sold by Kemix Co., Ltd.), and was bonded thereto in a general method, to prepared an integral electrode body. The integral electrode body was put between a pair of the fuel cell separators prepared in Inventive Example 1, to obtain a unit cell having fuel gas supplying/discharging passages. Then, 50 pieces of the unit cells were juxtaposed and fastened to each other with bolts and nuts, to obtain a fuel cell.

The fuel cell was proved to allow charging/discharging and to exhibit an effective function as a fuel cell.

To evaluate the performance necessary for an on-vehicle fuel cell, the fuel cell was subjected to a vibration and impact test. In this test, vibration and impact were repeatedly applied to the fuel cell by 1,000 times. As a result, the separators in the fuel cell were not broken.

Inventive Example 4
Polymer Electrolyte Fuel Cell (2)

A polymer electrolyte membrem (trade name: Nafion) was put between a pair of electrodes formed by the above-described carbon paper (sold by Kemix Co., Ltd.), and was bonded thereto in a general method, to prepared an integral electrode body. The integral electrode body was put between a pair of the fuel cell separators prepared in Inventive Example 2, to obtain a unit cell having fuel gas supplying/discharging passages. Then, 100 pieces of the unit cells were juxtaposed and fastened to each other with bolts and nuts, to obtain a fuel cell.

The fuel cell was proved to allow charging/discharging and to exhibit an effective function as a fuel cell.

To evaluate the performance necessary for an on-vehicle fuel cell, the fuel cell was subjected to the above-described vibration and impact test. In this test, vibration and impact were repeatedly applied to the fuel cell by 1,000 times. As a result, the separators in the fuel cell were not broken.

While the preferred embodiment of the present invention has been described using the specific terms, such description is for illustrative purposes only, and it is to be noted that changes and variations may be made without departing from the spirit or scope of the following claims.

What is claimed is:

1. A method of producing a fuel cell separator, comprising the steps of:

producing dry granules of a composition for a fuel cell separator mainly containing a conductive material, a binder, and an additive by mixing raw materials including at least said conductive material, said binder, and said additive, granulating the resultant mixture to obtain granules, and drying the granules; and packing said dry granules in a mold, and hot-press molding said dry granules packed in the mold;

wherein a residual volatile matter content of said dry granules is in a range of 4 wt % or less;

an average particle size of said dry granules is in a range of 200 to 700 $\mu$m; and a particle size distribution of said dry granules is as follows:

| particle size | percentage |
|---|---|
| 5 $\mu$m or more and less than 100 $\mu$m | 5 to 30% |
| 100 $\mu$m or more and less than 300 $\mu$m | 10 to 40% |
| 300 $\mu$m or more and less than 500 $\mu$m | 10 to 50% |
| 500 $\mu$m or more and less than 1000 $\mu$m | balance |

2. A method of producing a fuel cell separator, comprising the steps of:

producing sized dry granules of a composition for a fuel cell separator mainly containing a conductive material, a binder, and an additive by mixing raw materials including at least said conductive material, said binder, and said additive, granulating the resultant mixture to obtain granules, drying the granules, and sizing the dry granules; and packing said sized dry granules in a mold, and hot-press molding said sized dry granules packed in the mold;

wherein a residual volatile matter content of said sized dry granules is in a range of 4 wt % or less;

an average particle size of said sized dry granules is in a range of 60 to 160 $\mu$m; and a particle size distribution of said sized dry granules is as follows:

| particle size | percentage |
|---|---|
| 5 $\mu$m or more and less than 100 $\mu$m | 10 to 80% |
| 100 $\mu$m or more and less than 300 $\mu$m | 10 to 40% |
| 300 $\mu$m or more and less than 500 $\mu$m | balance |

3. A method of producing a fuel cell separator, comprising the steps of:

producing dry granules of a composition for a fuel cell separator mainly containing a conductive material, a binder, and an additive by mixing raw materials including at least said conductive material, said binder, and said additive, granulating the resultant mixture to obtain granules, and drying the granules; and packing said dry granules in a mold, and hot-press molding said dry granules packed in the mold;

wherein said step of mixing raw materials including at least said conductive material, said binder, and said additive comprises the steps of:

adding and mixing said additive to and with said conductive material, to obtain a sub-mixture;

adding said binder to said sub-mixture in an amount of 5 to 30 parts by mass on the basis of 100 parts by mass of said conductive material and simultaneously adding a solvent to said sub-mixture in an amount of 20 parts by mass or less on the basis of 100 parts by mass of said conductive material; and wet-mixing said sub-mixture with said binder and said solvent.

4. A method of producing a fuel cell separator, comprising the steps of:

producing sized dry granules of a composition for a fuel cell separator mainly containing a conductive material, a binder, and an additive by mixing raw materials including at least said conductive material, said binder, and said additive, granulating the resultant mixture to obtain granules, drying the granules, and sizing the dry granules; and packing said sized dry granules in a mold, and hot-press molding said sized dry granules packed in the mold;

wherein said step of raw materials including at least said conductive material, said binder, and said additive comprises the steps of:

adding and mixing said additive to and with said conductive material, to obtain a sub-mixture;

adding said binder to said sub-mixture in an amount of 5 to 30 parts by mass on the basis of 100 parts by mass of said conductive material and simultaneously adding a solvent to said sub-mixture in an amount of 20 parts by mass or less on the basis of 100 parts by mass of said conductive material; and wet-mixing said sub-mixture with said binder and said solvent.

5. A method of producing a fuel cell separator according to any one of claims 1 to 4, wherein said step of drying the granules is carried out by a vacuum drying method, a fluid bed drying method, a jet drier method, or an elevated temperature drying method.

6. A method of producing a fuel cell separator according to claim 1, wherein said conductive material is a powder of graphite which has an average particle size ranging from 10 to 80 $\mu$m.

* * * * *